US010356117B2

(12) United States Patent
Brabec et al.

(10) Patent No.: US 10,356,117 B2
(45) Date of Patent: Jul. 16, 2019

(54) BAYESIAN TREE AGGREGATION IN DECISION FORESTS TO INCREASE DETECTION OF RARE MALWARE

(71) Applicant: Cisco Technology, Inc., San Jose, CA (US)

(72) Inventors: Jan Brabec, Rakovnik (CZ); Lukas Machlica, Prague (CZ)

(73) Assignee: Cisco Technology, Inc., San Jose, CA (US)

( * ) Notice: Subject to any disclaimer, the term of this patent is extended or adjusted under 35 U.S.C. 154(b) by 176 days.

(21) Appl. No.: 15/648,563

(22) Filed: Jul. 13, 2017

(65) Prior Publication Data

US 2019/0020670 A1  Jan. 17, 2019

(51) Int. Cl.
*G06F 21/55* (2013.01)
*G06N 7/00* (2006.01)
*H04L 29/06* (2006.01)
*G06N 20/00* (2019.01)

(52) U.S. Cl.
CPC ......... *H04L 63/1425* (2013.01); *G06N 7/005* (2013.01); *G06N 20/00* (2019.01)

(58) Field of Classification Search
CPC ........... H04L 63/14; G06F 21/55; G06N 7/00; G06N 5/00; G06N 20/00
See application file for complete search history.

(56) References Cited

U.S. PATENT DOCUMENTS 8,306,942 B2  11/2012  Chen et al.
2015/0356576 A1  12/2015  Malaviya et al.

FOREIGN PATENT DOCUMENTS

JP  2016091306 A  5/2016
WO  WO-03075182 A1  9/2003

OTHER PUBLICATIONS

Chen, et al., "Using Random Forest to Learn Imbalanced Data", Department of Statistics, 12 pages, Jul. 2014, University of California—Berkeley.
Dawid, et al., "Maximum Likelihood Estimation of Observer Error-Rates Using the EM Algorithm", Journal of the Royal Statistical Society. Series C (Applied Statistics), vol. 28, No. 1(1979), pp. 20-28, Wiley.
Hoeting, et al., "Bayesian Model Averaging: A Tutorial", Statistical Science 1999, vol. 14, No. 4, pp. 382-417, JSTOR.

(Continued)

*Primary Examiner* — Izunna Okeke
(74) *Attorney, Agent, or Firm* — Behmke Innovation Group LLC; James Behmke; Stephen D. LeBarron

(57) ABSTRACT

In one embodiment, a computing device provides a feature vector as input to a random decision forest comprising a plurality of decision trees trained using a training dataset, each decision tree being configured to output a classification label prediction for the input feature vector. For each of the decision trees, the computing device determines a conditional probability of the decision tree based on a true classification label and the classification label prediction from the decision tree for the input feature vector. The computing device generates weightings for the classification label predictions from the decision trees based on the determined conditional probabilities. The computing device applies a final classification label to the feature vector based on the weightings for the classification label predictions from the decision trees.

14 Claims, 7 Drawing Sheets

(56) References Cited

OTHER PUBLICATIONS

Kim, et al., "Bayesian Classifier Combination", Appearing in Proceedings of the 15th International Conference on Artificial Intelligence and Statistics (AISTATS) 2012, La Palma, Canary Islands, Spain. vol. 11 of JMLR: W&CP 11.

Taddy, et al., "Bayesian and Empirical Bayesian Forests", Proceedings of the 32nd International Conference on Machine Learning, Lille, France, 2015. JMLR: W&CP vol. 37. arXiv:1502.02312v2.

Zhou, et al., "Loan Default Prediction on Large Imbalanced Data Using Random Forests", Telkomnika Indonesian Journal of Electrical Engineering, vol. 10, No. 6, Oct. 2012, pp. 1519-1525, Telkomnika IJEE.

BAYESIAN TREE AGGREGATION IN DECISION FORESTS TO INCREASE DETECTION OF RARE MALWARE

TECHNICAL FIELD

The present disclosure relates generally to computer networks, and, more particularly, to the dynamic tracking and/or modeling of systems according to risk level.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic.

Beyond the various types of legitimate application traffic in a network, some network traffic may also be malicious. For example, some traffic may seek to overwhelm a service by sending a large number of requests to the service. Such attacks are also sometimes known as denial of service (DoS) attacks. Other forms of malicious traffic may seek to exfiltrate sensitive information from a network, such as credit card numbers, trade secrets, and the like. Typically, such traffic is generated by a client that has been infected with malware. Thus, further types of malicious network traffic include network traffic that propagate the malware itself and network traffic that passes control commands to already infected devices.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
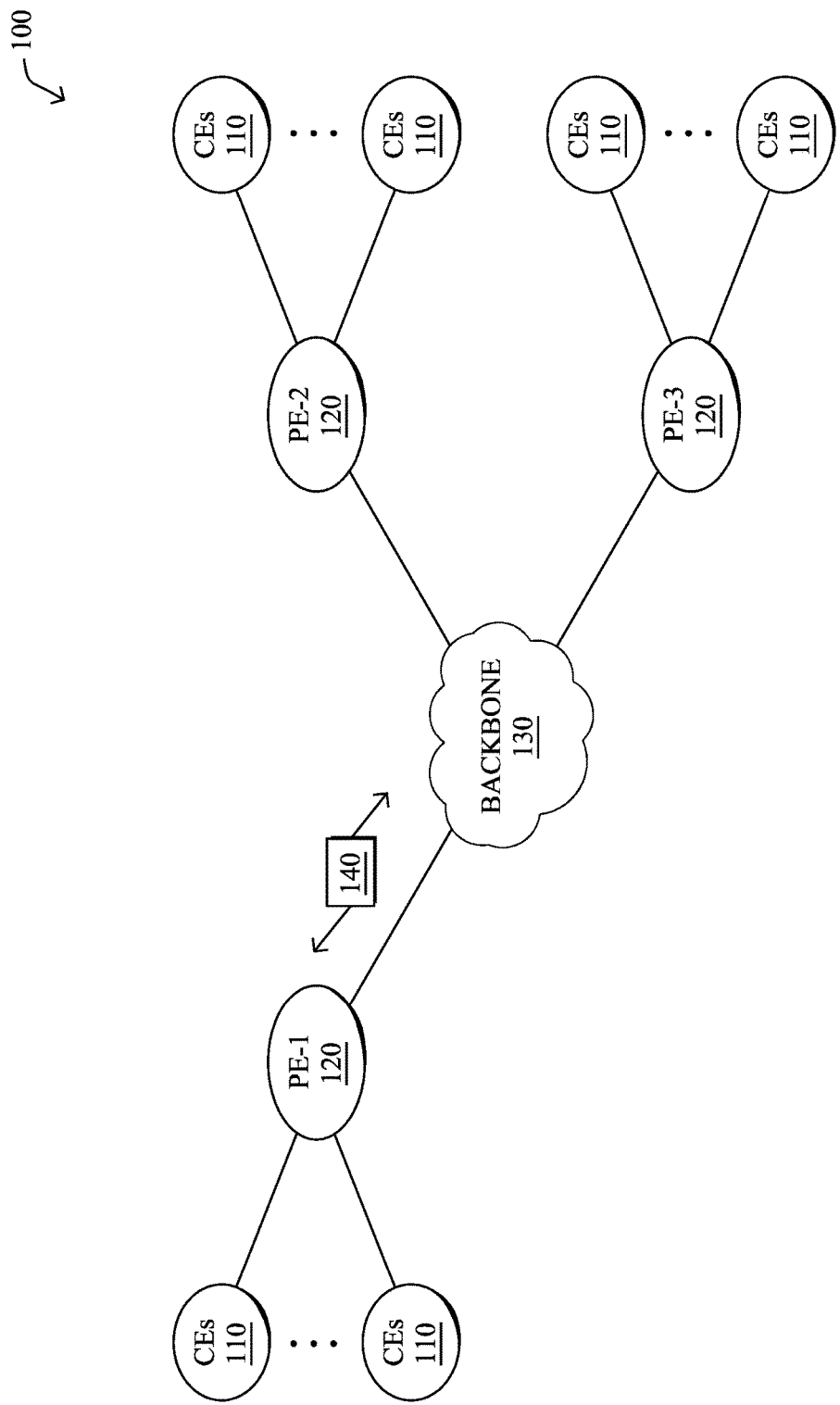
FIGS. 1A-1B illustrate an example communication network.

According to one or more embodiments of the disclosure, a computing device provides a feature vector as input to a random decision forest comprising a plurality of decision trees trained using a training dataset, each decision tree being configured to output a classification label prediction for the input feature vector. For each of the decision trees, the computing device determines a conditional probability of the decision tree based on a true classification label and the classification label prediction from the decision tree for the input feature vector. The computing device generates weightings for the classification label predictions from the decision trees based on the determined conditional probabilities. The computing device applies a final classification label to the feature vector based on the weightings for the classification label predictions from the decision trees.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
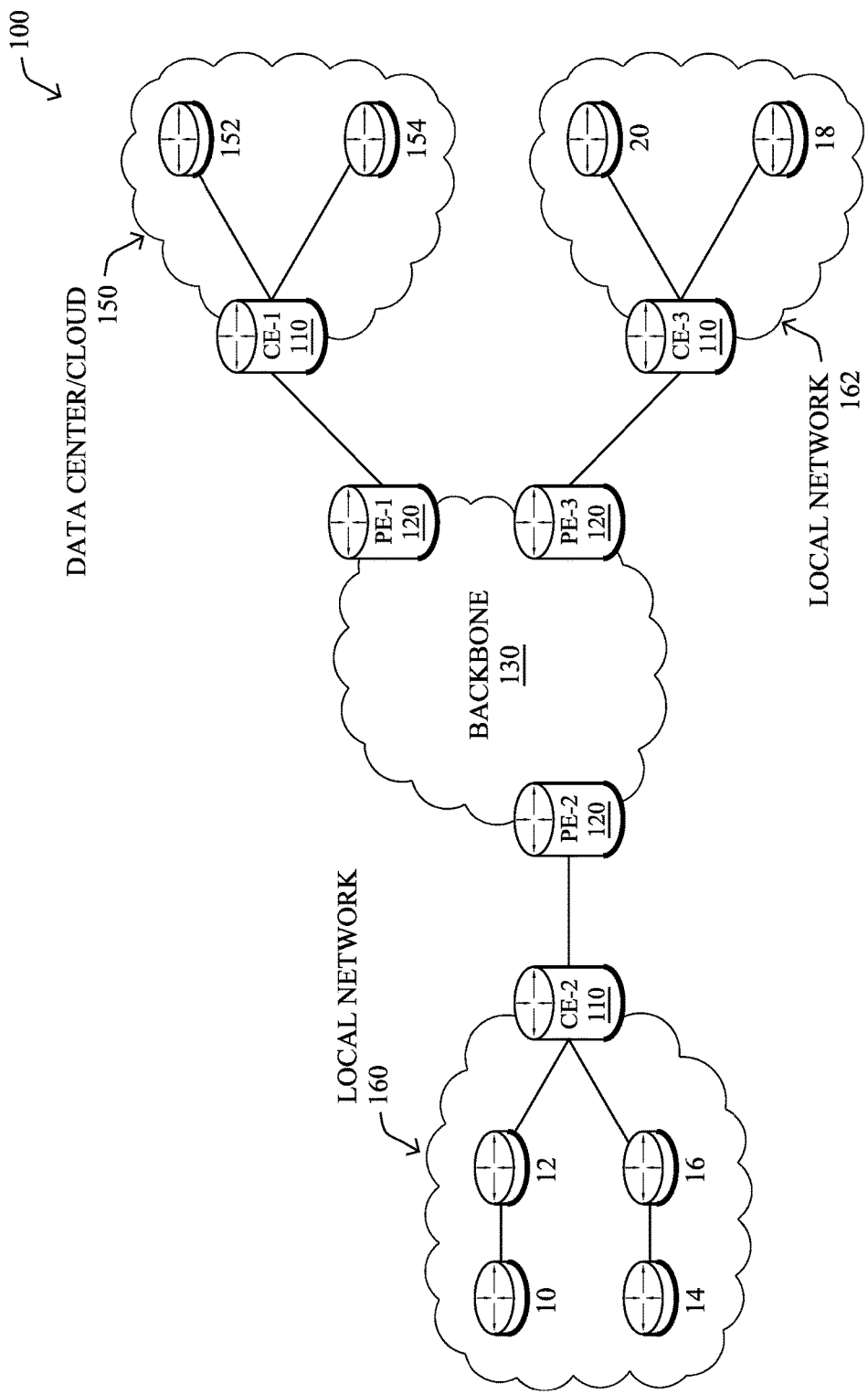

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
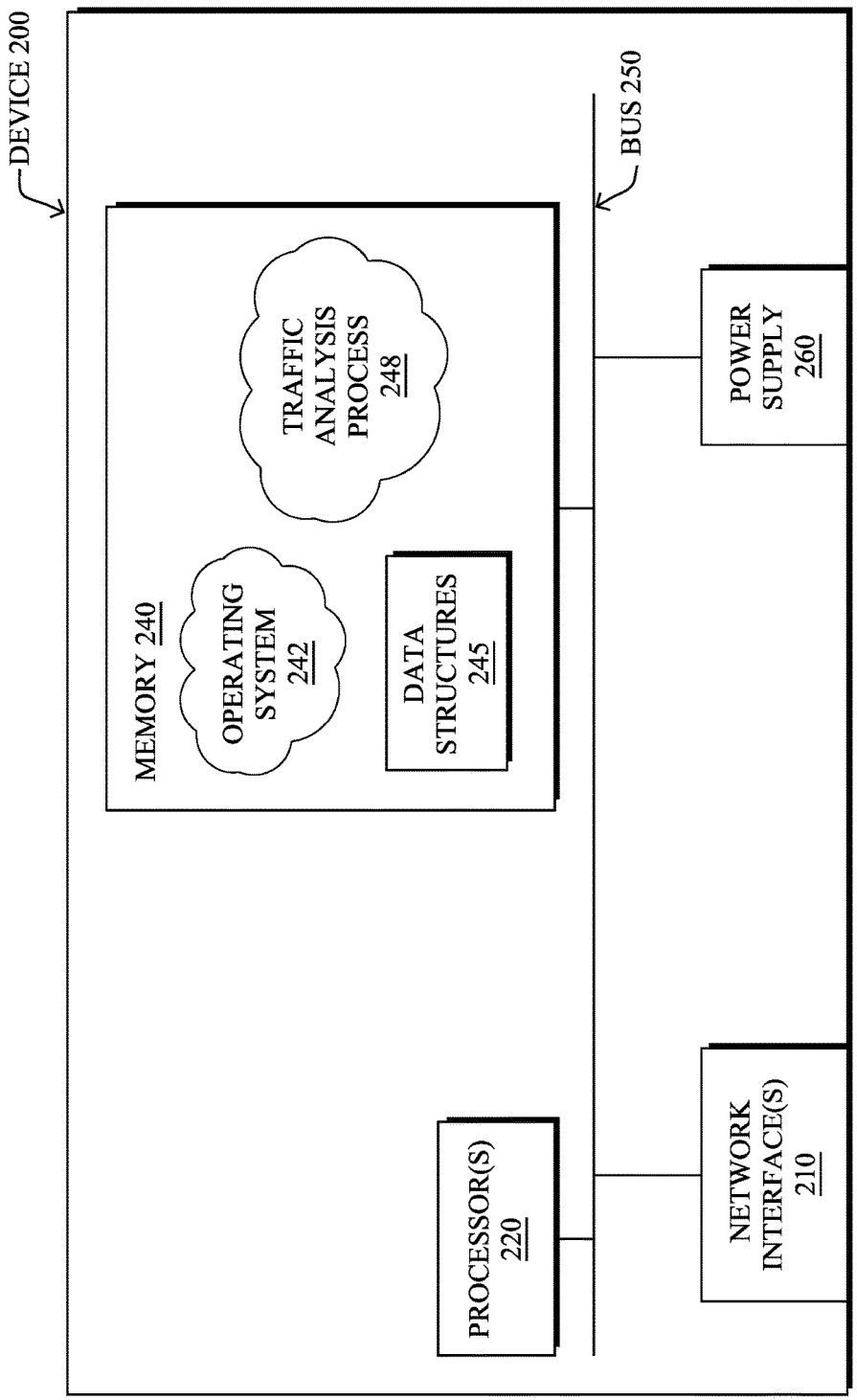
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other computing devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a traffic analysis process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, traffic analysis process 248 may execute one or more machine learning-based classifiers to classify traffic in the network for any number of purposes. In one embodiment, traffic analysis process 248 may assess captured telemetry data regarding one or more traffic flows, to determine whether a given traffic flow or set of flows are caused by malware in the network, such as a particular family of malware applications. Example forms of traffic that can be caused by malware may include, but is are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, traffic analysis process 248 may classify the gathered telemetry data to detect other anomalous behaviors (e.g., malfunctioning devices, misconfigured devices, etc.), traffic pattern changes (e.g., a group of hosts begin sending significantly more or less traffic), or the like.

Traffic analysis process 248 may employ any number of machine learning techniques, to classify the gathered traffic data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, traffic analysis 248 can use the model M to classify new data points, such as information regarding new traffic flows in the network. Often, M is a statistical model, and the cost function is inversely proportional to the likelihood of M, given the input data.

In various embodiments, traffic analysis process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that traffic analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random decision forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, traffic analysis process 248 may assess the captured telemetry data on a per-flow basis. In other embodiments, traffic analysis 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
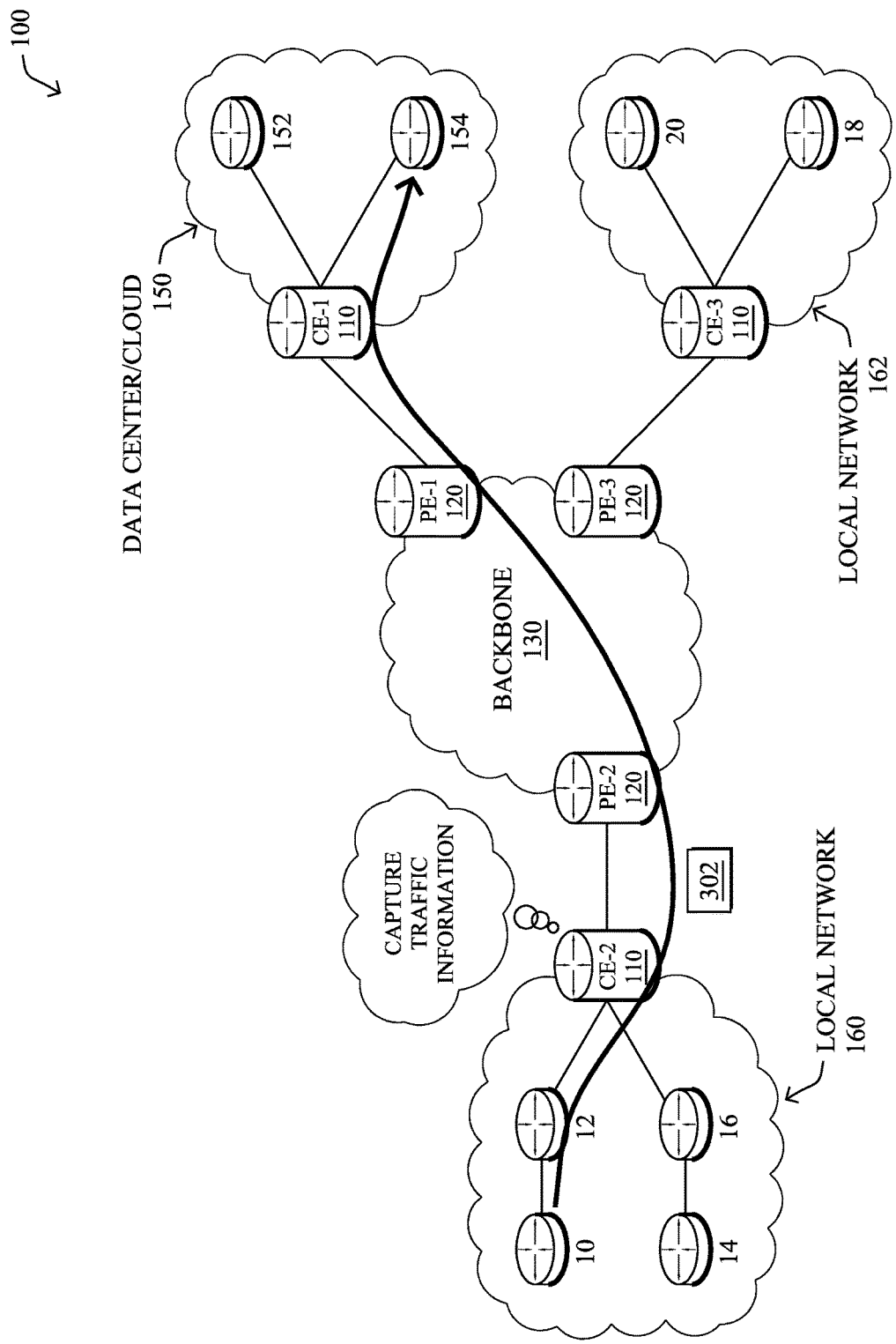
FIG. 3 illustrates an example of a device capturing traffic information.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, or other header information by analyzing the header of a packet 302. Example captured features may include, but are not limited to, Transport Layer Security (TLS) information (e.g., from a TLS handshake), such as the ciphersuite offered, user agent, TLS extensions, etc., Hypertext Transfer Protocol (HTTP) information (e.g., URI, etc.), Domain Name System (DNS) information, or any other data features that can be extracted from the observed traffic flow(s).

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302. In further examples, the capturing device may capture sequence of packet lengths and time (SPLT) data regarding the traffic flow, sequence of application lengths and time (SALT) data regarding the traffic flow, or byte distribution (BD) data regarding the traffic flow.

As noted above, one potential machine learning-based approach to traffic classification (e.g., to detect malware, etc.) leverages the use of a random decision forest to assess an input feature vector of one or more characteristics of the network traffic. Generally, a random decision forest comprises a plurality of uncorrelated decision trees, whereby nodes in a given tree represent decisions/conditions that are applied to the input feature(s). Thus, a path of a decision tree represents a set of applied decisions/conditions that, once applied, can be used to predict outcomes given the input feature(s).

Figure 4:
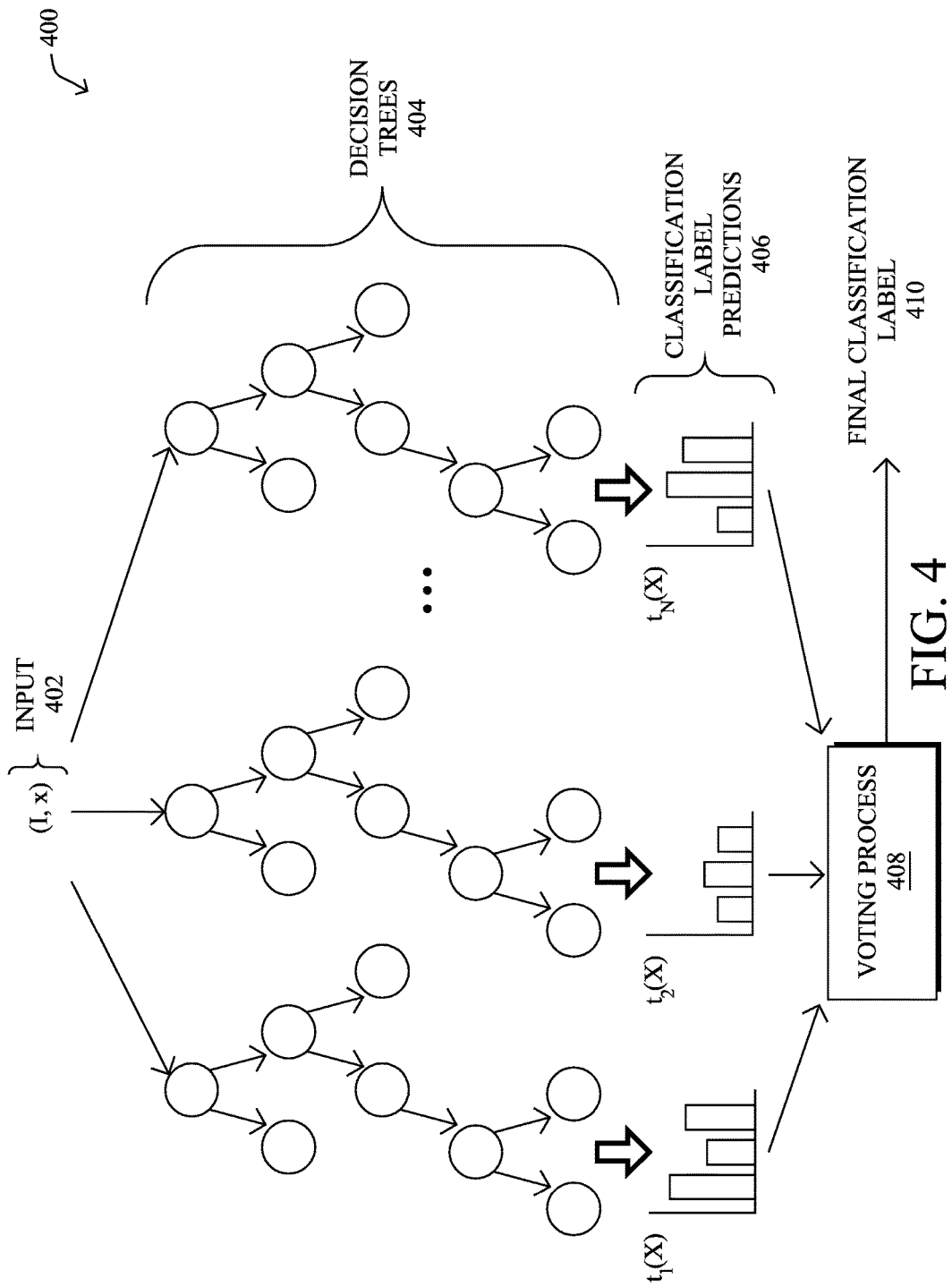
FIG. 4 illustrates an example random decision forest classifier.

FIG. 4 illustrates an example random decision forest classifier 400, according to various embodiments. In some embodiments, traffic analysis process 248 may use the random decision forest classifier 400 to determine a classification label for observed traffic in the network based on an input feature vector of the characteristics of the traffic. In a simplistic case, the classification labels may simply be "benign" or "malicious." However, more complicated, multi-class classifiers may also be used, e.g., to distinguish between different types of malware, etc.

As shown, random forest classifier 400 may comprise any number of decision trees 404 (e.g., a first through $n^{th}$ decision tree) each configured to generate classification label predictions 406 based on input 402. More specifically, as would be appreciated by one skilled in the art, nodes in decision trees 404 may correspond to different decisions/ conditions that can be applied to input 402. Probabilities can then be assigned, based on the results of these decisions/ conditions.

Training of decision trees 404 may be achieved using a technique referred to as 'bagging.' In particular, given a training dataset, each tree may be trained using a random subset of the training dataset that is sampled from the training dataset. Doing so increases the independence of the individual decision trees 404. The portion of the training dataset that is not used to train a given decision tree 404 is referred to as the 'out of bag (OOB)' dataset, which is typically different for each decision tree 400.

As each decision tree 404 generates its own classification label predictions 406 based on input 402, random decision forest 400 may also include a 'voting' process 408. During execution, voting process 408 may determine a final classification label 410 for input 402, based on the classification label predictions 406 from the individual decision trees 404.

More formally, the prediction 406 of the $i^{th}$ decision tree 404 in the forest of N-number of trees may be denoted as $t_i(x)$, where x is the data object to be classified from input 402. Further, let $Y=\{y_1, y_2, \ldots, y_K\}$ be the set of K-number of possible classification labels that forest 400 may apply, where $K=|Y|$. An additional notation that may be used to formally describe random decision forest 400 is I( ) which denotes an indicator function that equals one if the condition in argument is true and zero, otherwise. In many cases, voting process 408 is configured to use majority voting among the classification label predictions 406 from decision trees 404. Using the notation above, this can be expressed as the formula:

$$\text{argmax}_{y \in Y} \Sigma_{i=1}^{N} I(t_i(x)=y)) \qquad \text{(Equation 1)}$$

That is, input data feature vector x is classified with the classification label that received the most 'votes' from the ensemble of trees 404 (e.g., from classification label predictions 406).

Majority voting and other similar voting mechanisms for random decision forests, such as soft voting, do not take into account the prevalence of specific classes in the data and the possibility that the classes are imbalanced. Both issues are often present in the context of intrusion and malware detection, where the proportion of benign traffic to malware-related traffic is strongly imbalanced. By using an approach such as majority voting in these situations, it has been found that the resulting classifier suffers considerably in terms of recall.

One potential alternative to majority voting would be to use thresholding to determine the final classification label. In this approach, the classification label predictions that receive a number of votes above a predefined threshold will be used as the final classification label. However, this approach is often limited to two-class classifiers and becomes increasingly more difficult to implement in higher order classifiers.

Bayesian Tree Aggregation in Decision Forests to Increase Detection of Rare Malware The techniques herein introduce a new aggregation mechanism that is particularly suited for use in random decision forest classifiers with imbalanced classes. This is often the case with respect to intrusion/malware detection in a network. However, such situations may also occur in other endeavors such as the diagnosis of rare diseases, telecommunications, web analysis, ecology and biology modeling, and in any other field in which the number of objects of interest is in the minority. In certain aspects, the techniques herein change the functioning of a random decision forest by employing voting weightings based on the posterior prediction probabilities of the decision trees. These posterior prediction probabilities can be estimated, for example, by leveraging the OOB datasets for the trees, which is typically ignored with other voting mechanisms.

Specifically, according to one or more embodiments of the disclosure as described in detail below, a computing device provides a feature vector as input to a random decision forest comprising a plurality of decision trees trained using a training dataset, each decision tree being configured to output a classification label prediction for the input feature vector. For each of the decision trees, the computing device determines a conditional probability of the decision tree based on a true classification label and the classification label prediction from the decision tree for the input feature vector. The computing device generates weightings for the classification label predictions from the decision trees based on the determined conditional probabilities. The computing device applies a final classification label to the feature vector based on the weightings for the classification label predictions from the decision trees.

Illustratively, the techniques described herein may be performed by hardware, software, and/or firmware, such as in accordance with the traffic analysis process 248, which may include computer executable instructions executed by the processor 220 (or independent processor of interfaces 210) to perform functions relating to the techniques described herein.

Operationally, and referring again to FIG. 4, the techniques herein introduce a voting mechanism for the aggregation of predictions of individual decision trees in a decision forest classifier. Preliminary testing has shown these techniques to be very well suited for multi-class classification and for datasets with imbalanced classes (e.g., the number of samples/objects in each class varies significantly). However, the voting mechanism can also be used to aggregate any predictions from a collection of independent classifiers, in further implementations.

In one aspect of the techniques herein, the conditional probability may be computed of the true label y given the predictions of the individual decision trees 404. Using the formulation above, this means that the sample x is now classified as having the class label with maximal probability expressed by formula:

$$\mathrm{argmax}_{y \in Y} P(y | t_1(x), \ldots t_N(x)) \qquad \text{(Equation 2)}$$

Note that instead of computing the probability of the class label given the sample/object x itself, the system may instead compute the posterior given the prediction $t_i(x)$ obtained from the $i^{th}$ decision tree 404.

Using Bayes' theorem, Equation 2 can be transformed into the following:

$$\mathrm{argmax}_{y \in Y} \frac{P(y) * P(t_1(x), \ldots t_N(x) | y)}{P(t_1(x), \ldots t_N(x))} \qquad \text{(Equation 3)}$$

Note that the denominator in Equation 3 is constant, which means that it does not depend on the true label y. Since only the value for which Equation 3 is maximized is of interest, the denominator of Equation 3 can be ignored, leading to the following expression to be maximized:

$$\mathrm{argmax}_{y \in Y} P(y) * P(t_1(x), \ldots t_N(x) | y) \qquad \text{(Equation 4)}$$

Independence is also assumed between decision trees 404. This is a fair assumption as the bagging training process also constructs decision trees 404 in a manner that greatly reduces correlation between individual trees. If such an assumption is made, Equation 4 can be written as follows:

$$\mathrm{argmax}_{y \in Y} P(y) * \Pi_{i=1}^{N} P(t_i(x) | y) \qquad \text{(Equation 5)}$$

As in a Naïve Bayes classifier, in order to prevent arithmetic underflows, Equation 5 can be adjusted to instead compute the sum of logarithms as follows:

$$\mathrm{argmax}_{y \in Y} \log P(y) + \Sigma_{i=1}^{N} \log(P(t_i(x) | y)) \qquad \text{(Equation 6)}$$

In various embodiments, the above probabilities can be computed from the training dataset used to train decision trees 404. Such a process can be performed either on the device executing random decision forest 400, or elsewhere, to populate a lookup table accessible by voting process 408. More specifically, the probability P(y) is the prevalence of the class with label y and equals the fraction of objects with label y related to all the objects in the training dataset. Note that the higher the number of independent predictors given Equation 6, the lower the influence of the prior.

In some embodiments, $P(t_i(x)|y)$ may be computed leveraging the OOB dataset from the training dataset. For example, once a given decision tree 404 is trained using a randomly selected portion of the training dataset, that decision tree can then be used to classify those portions of the training dataset that were not used to train that tree (e.g., OOB dataset). Knowing the true labels for the training dataset, a confusion matrix can then be computed from these results, which indicates the misclassifications by that decision tree.

Formulaically, let $c_{kl}$ be the element of the confusion matrix for tree i, where k refers to the true class label and l is the prediction label. Then, $c_{k,l}$ equals the number of objects that were classified as class l but their true label is class k, giving the following expression:

$$P(t_i(x) | y_k) = \frac{c_{k, t_i(x)}}{\sum_{l=1}^{K} c_{k,l}} \qquad \text{(Equation 7)}$$

Because the probabilities computed from the confusion matrices are merely estimates of the true underlying probabilities, it is reasonable to set the lower bound for the probability estimate to a small non-zero value if the computed probability is zero. Otherwise, if this is not done, there would be a multiplication by zero in Equation 5 and a single prediction from a single decision tree 404 would cause the whole expression for the class y to be zero.

By way of example, consider the following confusion matrix for a single decision tree 404, with three possible classes, as follows:

TABLE 1

|       | $t_i = 1$ | $t_i = 2$ | $t_i = 3$ |
|-------|-----------|-----------|-----------|
| y = 1 | 1         | 10        | 2         |
| y = 2 | 10        | 300       | 5         |
| y = 3 | 5         | 20        | 1         |

The rows in the confusion matrix shown in Table 1 above represent the true classification label and the columns represent the classification label predictions from the decision tree under analysis. The probabilities $P(t_i(x)|y)$ given in Equation 7 above are computed as follows:

$P(1|1)=1/(1+10+2)=0.077$ $P(1|2)=10/(10+300+5)=0.032$ $P(1|3)=5/(5+20+1)=0.192$ $P(2|1)=10/(1+10+2)=0.769$ $P(2|2)=300/(10+300+5)=0.952$ $P(2|3)=20/(5+20+1)=0.769$ $P(3|1)=2/(1+10+2)=0.153$ $P(3|2)=5/(10+300+5)=0.016$ $P(3|3)=1/(5+20+1)=0.038$

The first column in the confusion matrix of Table 1 represents the number of objects from classes 1, 2 and 3, but classified by the decision tree as being from class 1. In simple terms, P(1|3), for example, expresses how probable it is to see a prediction $t_i(x)=1$ predicted by the $i^{th}$ tree if the true class is y=3.

By applying the estimated probabilities P(1|1), P(1|2), P(1|3) to Equation 5, it can be seen that the class with the highest weight is the class number 3, even if most of the objects predicted as class 1 come from the class 2. That is, these probabilities do not depend on the number of samples in a class. The reasoning for this, in the case of imbalanced classes, is that the probability of seeing an object from a class with minority of samples is lower, as well as the posterior probabilities P(y|x) commonly predicted by the decision trees 404. Thus, the aggregation effectively removes the imbalance since each prediction is related to the object counts in a class. Note that if the number of objects in each class is balanced, class with highest number of objects (y=2) would be preferred and the mechanism would behave as expected.

The class prior probabilities can be also computed from the confusion matrix as:

$P(1)=(1+10+2)/(5+20+1+10+300+5+1+10+2)=0.037$ $P(2)=(10+300+5)/(5+20+1+10+300+5+1+10+2)$
$=0.890$ $P(3)=(5+20+1)/(5+20+1+10+300+5+1+10+2)=0.073$

As an example, if forest 400 has a single decision tree 404, evaluation of Equation 5 would result in the following for each class probability:

$y=1: P(1)*P(1|1)=0.037*0.077=0.003$ $y=2: P(2)*P(1|2)=0.890*0.032=0.028$ $y=3: P(3)*P(1|3)=0.073*0.192=0.014$

Here, the maximum weighting value occurs for class y=2, because there is only one predictor and the influence of the prior is strong.

In another example, the situation changes if the number of trees 404 (independent predictors) in forest 400 increases. For simplicity, assume that forest 400 has ten decision trees 404, each with the same confusion matrix predicting the same class. In such a case, evaluation of Equation 5 would result in the following:

$y=1: P(1)*P(1|1)^{10}=0.037*0.077^{10}=5.35E\text{-}13$ $y=2: P(2)*P(1|2)^{10}=0.890*0.032^{10}=1.00E\text{-}15$ $y=3: P(3)*P(1|3)^{10}=0.073*0.192^{10}=4.97E\text{-}09$ That is, since there are now more independent predictors (e.g., decision trees 404), the prior P(y) is of less importance and the final prediction changes to class y=3.

Figure 5:
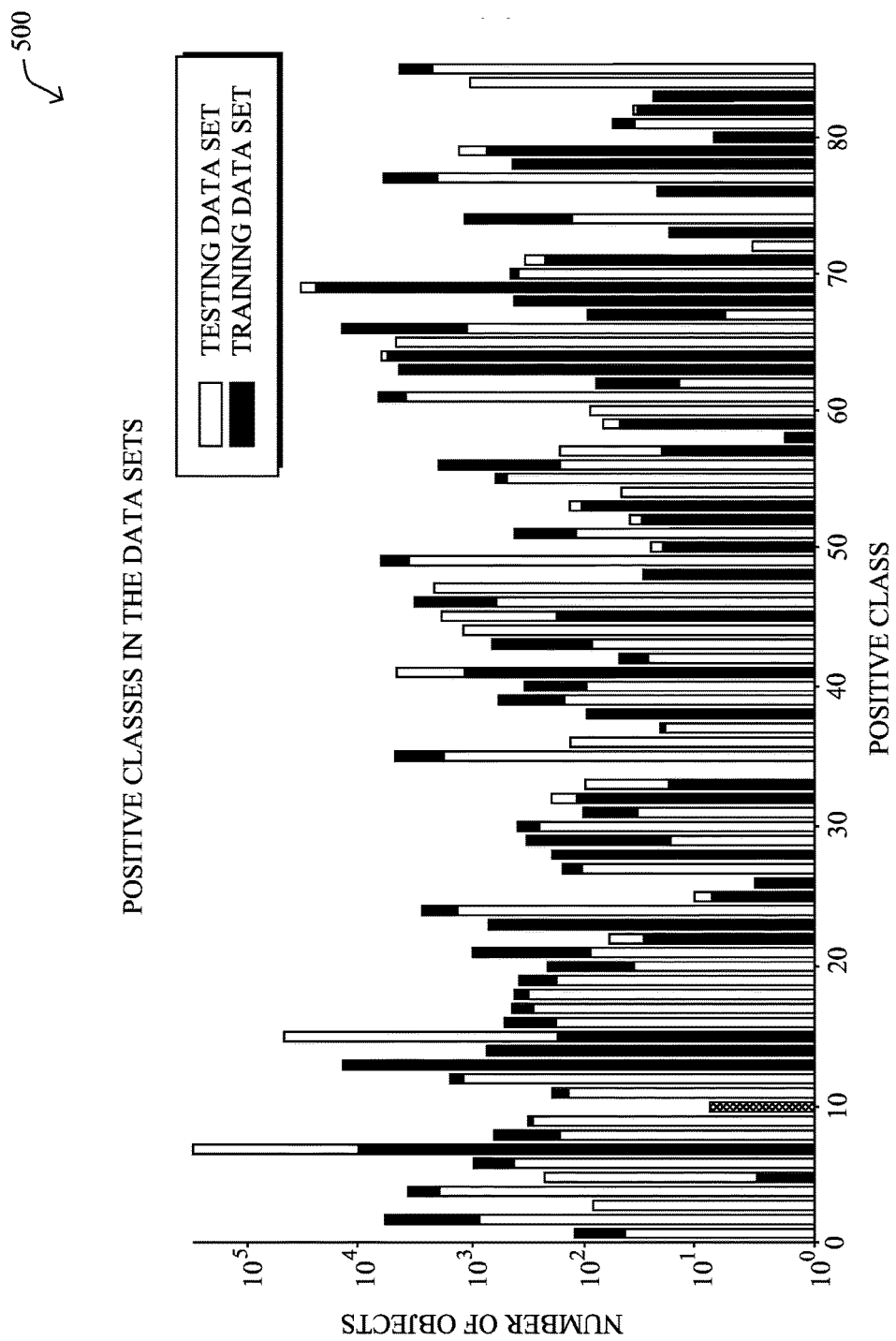
FIG. 5 illustrates an example plot of class imbalances among a training dataset.

FIG. 5 illustrates an example plot 500 of class imbalances among a training dataset. To test the efficacy of the techniques herein, several experiments were conducted with multi-class classification of network traffic for purposes of malware detection. In particular, 86 different malware classes were defined, ranging from spam tracking, to ad injectors, to fraudulent data extractors. A further class was defined to represent the benign network and this was by far the majority class with an imbalance ratio of at least 1:100. In other words, there were at least 100 times more benign traffic requests than malware requests. The class imbalance between positive classes can be clearly seen in plot 500, with the y-axis of plot 500 being on a logarithmic scale.

The training dataset was formed from traffic proxy logs recorded over the span of three days and included 3,359,466 objects (note: the benign/negative set was down-sampled). Test data was then collected thereafter on a single day and included 10,895,786 objects. Using the training dataset, a random decision forest with twenty decision trees was trained and evaluated against the test set. For each class, precision and recall was computed individually. The average precision and recall over all of the malware classes was then computed using a soft voting mechanism and again using a mechanism that employs the Bayesian tree techniques herein, as shown below:

TABLE 2

|  | avg recall | avg precision |
| --- | --- | --- |
| soft voting | 64.4 | 96.9 |
| Bayesian tree aggregation | 71.3 | 94.1 |

Thus, as shown in Table 2, preliminary results indicate that the techniques herein provide a significant increase in recall (7%), with only a slight decrease in the precision. It is possible that some of the incorrect classifications can still originate from malware, but further investigation of these misclassifications was not performed. Therefore, the precision can be viewed as the lower bound.

Figure 6:
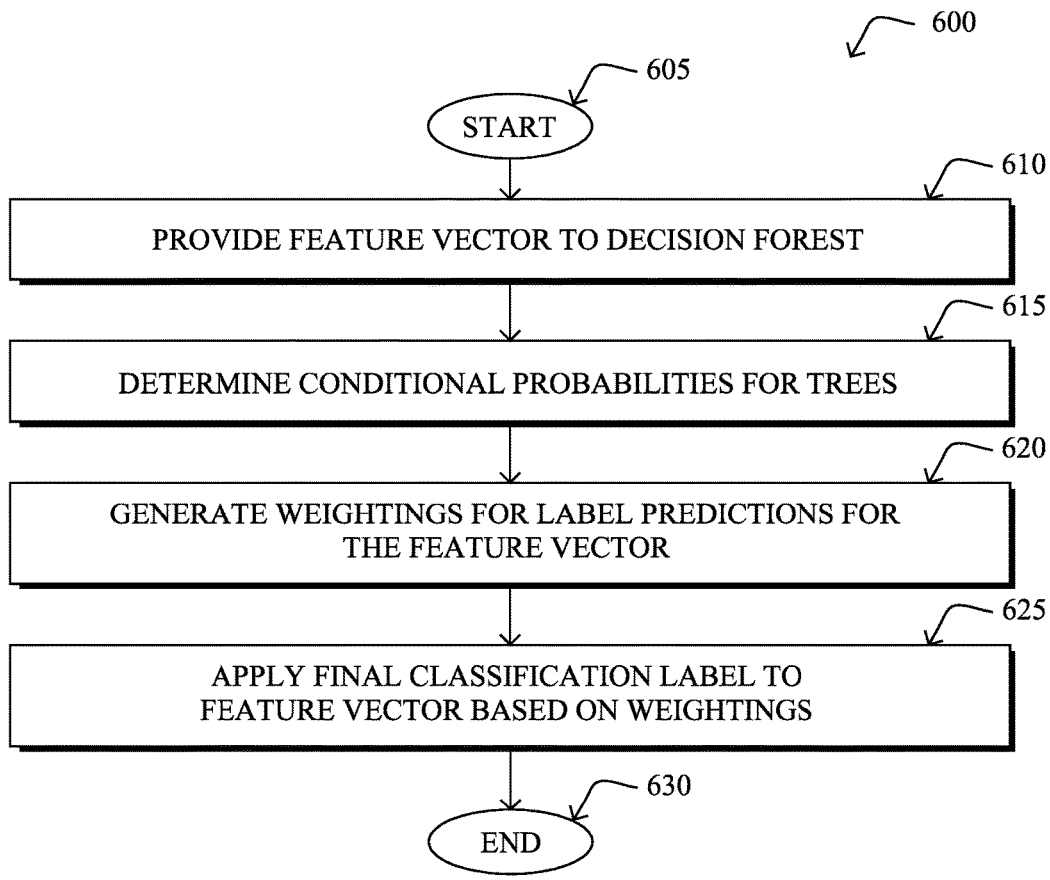
FIG. 6 illustrates an example simplified procedure for classifying an input feature vector using a random decision forest.

FIG. 6 illustrates an example simplified procedure for classifying an input feature vector using a random decision forest, in accordance with one or more embodiments described herein. For example, a non-generic, specifically configured device (e.g., device 200) may perform procedure 600 by executing stored instructions (e.g., process 248). The procedure 400 may start at step 605, and continues to step 610, where, as described in greater detail above, the computing device may provide a feature vector as input to a random decision forest. In various embodiments, the decision forest may comprise a plurality of decision trees trained using a training dataset. Each decision tree in the forest may generally be configured to output a classification label prediction for the input feature vector.

At step 615, as detailed above, the computing device may determine, for each of the decision trees, a conditional probability of the decision tree based on the true classification label and the classification label prediction from the decision tree for the input feature vector. In various embodiments, the computing device may determine such values by performing a lookup of a lookup table. Such a table may be populated, for example, by evaluating, for each of the decision trees, the portion of the training dataset that was not used to train that decision tree. In other words, the out of bag (OOB) dataset may be leveraged to determine reasonable estimates of these probabilities.

At step 620, the computing device may generate weightings for the classification label predictions from the decision trees based on the determined conditional probabilities, as described in greater detail above. In particular, rather than employing an equal weighting, such as in the case of majority voting, the predictions from the different decision trees can be weighted according to their estimated posterior prediction probabilities determined from their OOB datasets.

At step 625, as detailed above, the computing device may apply a final classification label to the feature vector based on the weightings for the classification label predictions from the decision trees. For example, in the case of detecting malware, the computing device may classify a traffic flow or set of traffic flows as indicative of a particular type of malware. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a voting/aggregation mechanism for a decision forest that is able to take into account the class imbalance during the prediction aggregation. In some aspects, the mechanism naturally incorporates the prior probability, which is used as a trade-off between recall and precision in situations when the number of predictors is low. Further, the techniques herein leverage information from the OOB datasets, to estimate the posterior prediction probabilities and increase recall of the classifier. The techniques herein are also better able to handle multi-class problems versus score/prediction thresholding, which require manual threshold adjustments. Further, no misclassifications costs have to be set in order to treat the imbalance classes. The techniques also work without any modifications for balanced classes and can also work with any ensemble model.

While there have been shown and described illustrative embodiments that provide for a voting/aggregation mechanism for a decision forest, it is to be understood that various other adaptations and modifications may be made within the spirit and scope of the embodiments herein. For example, while certain embodiments are described herein with respect to using certain models for purposes of malware detection, the models are not limited as such and may be used for other functions, in other embodiments. In addition, while certain protocols are shown, such as HTTP and HTTPS, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   providing, by a computing device, a feature vector as input to a random decision forest comprising a plurality of decision trees trained using a training dataset, each decision tree being configured to output a classification label prediction for the input feature vector;
   determining, by the computing device and for each of the decision trees, a conditional probability of the decision tree based on a true classification label and the classification label prediction from the decision tree for the input feature vector, wherein determining includes:
      performing, by the computing device, a lookup of the conditional probabilities from a lookup table, wherein the conditional probabilities were calculated by using as input, for each decision tree, a portion of the training dataset that was not used to train that decision tree, and
      calculating the conditional probabilities by using as input, for each decision tree, a portion of the training dataset that was not used to train that decision tree;
   generating, by the computing device, weightings for the classification label predictions from the decision trees based on the determined conditional probabilities; and
   applying, by the computing device, a final classification label to the feature vector based on the weightings for the classification label predictions from the decision trees.

2. The method as in claim 1, wherein the feature vector comprises one or more characteristics of observed traffic in a network, and wherein the final classification label indicates the presence of malware in the network.

3. The method as in claim 1, wherein generating weightings for the classification label predictions from the decision trees based on the determined conditional probabilities comprises:
   computing, by the computing device and for each classification label in the classification label predictions, a product of the corresponding determined conditional probabilities.

4. The method as in claim 1, wherein generating weightings for the classification label predictions from the decision trees based on the determined conditional probabilities comprises:
   computing, by the computing device and for each classification label in the classification label predictions, a sum of logarithms of the corresponding determined conditional probabilities.

5. The method as in claim 1, further comprising:
   randomly selecting samples from the training dataset; and
   using the randomly selected samples to train the decision trees.

6. An apparatus, comprising:
   one or more network interfaces to communicate with a network;
   a processor coupled to the network interfaces and configured to execute one or more processes; and
   a memory configured to store a process executable by the processor, the process when executed configured to:
      provide a feature vector as input to a random decision forest comprising a plurality of decision trees trained using a training dataset, each decision tree being configured to output a classification label prediction for the input feature vector;

determine, for each of the decision trees, a conditional probability of the decision tree based on a true classification label and the classification label prediction from the decision tree for the input feature vector, wherein the determination includes:
  performing a lookup of the conditional probabilities from a lookup table, wherein the conditional probabilities were calculated by using as input, for each decision tree, a portion of the training dataset that was not used to train that decision tree, and
  calculating the conditional probabilities by using as input, for each decision tree, a portion of the training dataset that was not used to train that decision tree;
generate weightings for the classification label predictions from the decision trees based on the determined conditional probabilities; and
apply a final classification label to the feature vector based on the weightings for the classification label predictions from the decision trees.

7. The apparatus as in claim 6, wherein the feature vector comprises one or more characteristics of observed traffic in a network, and wherein the final classification label indicates the presence of malware in the network.

8. The apparatus as in claim 6, wherein the apparatus generates the weightings for the classification label predictions from the decision trees based on the determined conditional probabilities by:
  computing, for each classification label in the classification label predictions, a product of the corresponding determined conditional probabilities.

9. The apparatus as in claim 6, wherein the apparatus generates the weightings for the classification label predictions from the decision trees based on the determined conditional probabilities by:
  computing, for each classification label in the classification label predictions, a sum of logarithms of the corresponding determined conditional probabilities.

10. The apparatus as in claim 6, wherein the process when executed is further configured to:
  randomly select samples from the training dataset; and
  use the randomly selected samples to train the decision trees.

11. A tangible, non-transitory, computer-readable medium storing program instructions that cause a computing device to execute a process comprising:
  providing, by the computing device, a feature vector as input to a random decision forest comprising a plurality of decision trees trained using a training dataset, each decision tree being configured to output a classification label prediction for the input feature vector;
  determining, by the computing device and for each of the decision trees, a conditional probability of the decision tree based on a true classification label and the classification label prediction from the decision tree for the input feature vector, wherein determining includes:
    performing, by the computing device, a lookup of the conditional probabilities from a lookup table, wherein the conditional probabilities were calculated by using as input, for each decision tree, a portion of the training dataset that was not used to train that decision tree, and
    calculating the conditional probabilities by using as input, for each decision tree, a portion of the training dataset that was not used to train that decision tree;
  generating, by the computing device, weightings for the classification label predictions from the decision trees based on the determined conditional probabilities; and
  applying, by the computing device, a final classification label to the feature vector based on the weightings for the classification label predictions from the decision trees.

12. The computer-readable medium as in claim 11, wherein the feature vector comprises one or more characteristics of observed traffic in a network, and wherein the final classification label indicates the presence of malware in the network.

13. The computer-readable medium as in claim 11, wherein generating weightings for the classification label predictions from the decision trees based on the determined conditional probabilities comprises:
  computing, by the computing device and for each classification label in the classification label predictions, a product of the corresponding determined conditional probabilities.

14. The computer-readable medium as in claim 11, wherein generating weightings for the classification label predictions from the decision trees based on the determined conditional probabilities comprises:
  computing, by the computing device and for each classification label in the classification label predictions, a sum of logarithms of the corresponding determined conditional probabilities.

* * * * *

UNITED STATES PATENT AND TRADEMARK OFFICE
CERTIFICATE OF CORRECTION

PATENT NO. : 10,356,117 B2
APPLICATION NO. : 15/648563
DATED : July 16, 2019
INVENTOR(S) : Jan Brabec et al.

It is certified that error appears in the above-identified patent and that said Letters Patent is hereby corrected as shown below:

In the Specification

Column 5, Line 39, please amend as shown:
caused by malware may include, but are not limited to, Signed and Sealed this
Twenty-first Day of July, 2020

Andrei Iancu
*Director of the United States Patent and Trademark Office*